United States Patent
Morano (10) Patent No.: US 11,936,331 B2
(45) Date of Patent: Mar. 19, 2024

(54) ROOF ATTACHMENT SYSTEM AND APPARATUS

(71) Applicant: Ecofasten Solar, LLC, Phoenix, AZ (US)

(72) Inventor: Alexander Alex Morano, Portland, OR (US)

(73) Assignee: Ecofasten Solar, LLC, Phoenix, AZ (US)

( * ) Notice: Subject to any disclaimer, the term of this patent is extended or adjusted under 35 U.S.C. 154(b) by 141 days.

(21) Appl. No.: 17/762,883

(22) PCT Filed: Sep. 23, 2020

(86) PCT No.: PCT/US2020/052331
§ 371 (c)(1),
(2) Date: Mar. 23, 2022

(87) PCT Pub. No.: WO2021/061866
PCT Pub. Date: Apr. 1, 2021

(65) Prior Publication Data
US 2023/0336108 A1   Oct. 19, 2023

Related U.S. Application Data

(60) Provisional application No. 62/904,675, filed on Sep. 23, 2019.

(51) Int. Cl.
*H02S 20/23*   (2014.01)
(52) U.S. Cl.
CPC .................................. *H02S 20/23* (2014.12)

(58) Field of Classification Search
CPC .......... H02S 20/23; H02S 20/24; H02S 20/25; F24S 25/636
See application file for complete search history.

(56) References Cited

U.S. PATENT DOCUMENTS 332,022 A   12/1885   Todd
3,974,904 A   8/1976   Morton
(Continued)

FOREIGN PATENT DOCUMENTS

DE   10 2013 009 834 A1   12/2014

OTHER PUBLICATIONS

PCT International Search Report for International Application No. PCT/US2020/052331 dated Dec. 14, 2020 (2 pages).
(Continued)

*Primary Examiner* — Eret C McNichols
(74) *Attorney, Agent, or Firm* — KW Law, LLP (57) ABSTRACT

A roof attachment system may comprise a mounting bracket, and a retention bracket. The mounting bracket may be configured to be attached to a roof. The retention bracket may be adjustably coupled to the bracket. The retention bracket may comprise a body portion, a first arm and a second arm. The first arm may be operatively coupled to the body portion. The first arm may also extend away from the body portion. The first arm may be substantially perpendicular to the body portion. The second arm operatively coupled to the body portion. The second arm may also extend away from the body portion. The second arm, like the first arm, may be substantially perpendicular to the body. The first arm may be parallel to the second arm.

20 Claims, 12 Drawing Sheets

(56) References Cited

U.S. PATENT DOCUMENTS

| | | | |
|---|---|---|---|
| 7,866,099 B2* | 1/2011 | Komamine | H02S 20/00 |
| | | | 52/173.3 |
| 8,713,881 B2 | 5/2014 | DuPont et al. | |
| 8,894,033 B2 | 11/2014 | Hartelius et al. | |
| 8,938,932 B1* | 1/2015 | Wentworth | F24S 25/61 |
| | | | 52/173.3 |
| 9,447,988 B2* | 9/2016 | Stearns | E04D 13/00 |
| 9,577,571 B2* | 2/2017 | Atia | F24S 25/613 |
| 9,647,157 B2 | 5/2017 | West et al. | |
| 9,806,668 B2 | 10/2017 | Johansen et al. | |
| 9,876,462 B2* | 1/2018 | Hudson | H02S 20/23 |
| 9,985,577 B2 | 5/2018 | Ironridge | |
| 10,151,114 B2 | 12/2018 | Stearns et al. | |
| 10,277,162 B1* | 4/2019 | Atia | F24S 25/613 |
| 10,676,929 B2* | 6/2020 | Stearns | E04D 13/00 |
| 10,989,247 B2* | 4/2021 | Uppu | H02S 20/00 |
| 11,296,648 B1* | 4/2022 | Jasmin | F16B 5/0233 |
| 11,750,143 B1* | 9/2023 | Jasmin | H02S 30/10 |
| | | | 248/237 |
| 2013/0048816 A1* | 2/2013 | Wentworth | F24S 25/35 |
| | | | 248/237 |
| 2013/0291479 A1* | 11/2013 | Schaefer | F24S 25/70 |
| | | | 52/745.21 |
| 2014/0202525 A1* | 7/2014 | Janssens | F16M 13/02 |
| | | | 248/575 |
| 2017/0194902 A1 | 7/2017 | Ironridge | |
| 2018/0048261 A1* | 2/2018 | Franklin | H02S 30/10 |
| 2018/0062571 A1* | 3/2018 | Ash | H02S 20/23 |
| 2018/0087558 A1 | 3/2018 | Feldmann et al. | |
| 2022/0352848 A1* | 11/2022 | Meine | H02S 20/23 |
| 2022/0403862 A1* | 12/2022 | Justice | H02S 20/23 |
| 2023/0336108 A1* | 10/2023 | Morano | H02S 20/23 |

OTHER PUBLICATIONS

Written Opinion of the International Searching Committee for International Application No. PCT/US2020/052331 dated Dec. 14, 2020 (8 pages).

European Search Report for PCT/US2020052331 dated Sep. 27, 2023 (7 pages).

* cited by examiner

ROOF ATTACHMENT SYSTEM AND APPARATUS

CROSS REFERENCE TO RELATED APPLICATIONS

This application is a National Stage Application of PCT/US20/52331 filed on Sep. 23, 2020, which claims priority to the and the benefit of U.S. Ser. No. 62/904,675 filed on Sep. 23, 2019 and entitled Click Fit System and Apparatus, each of which is hereby incorporated by reference in its entirety for an purpose.

FIELD

The present disclosure relates to roof attachments and, more specifically, to roof mounting attachments for installing solar panels.

BACKGROUND

There is a need for a solar roof attachment system that provides for rapid installation on any roof type. Moreover, there is a need for a cost effective, manufacturable roof attachment systems for installation on any roof type.

SUMMARY

In various embodiments, a roof mount may comprise a mounting bracket, a fastener assembly, and a retention bracket. The mounting bracket may comprise a slot (e.g., an oval opening, or an aperture with a length greater than a width). The fastener assembly may comprise a fastener and a square nut. The square nut may have a cylindrical raised portion. The retention bracket may be adjustably coupled to the mounting bracket with the fastener assembly. The retention bracket may comprise a body portion, a first arm, and a second arm. The body portion may comprise an elastically deflectable tab. The body portion may also comprise an anti-rotation boss. The body portion may further comprise a through hole. The anti-rotation boss may be adjacent the through hole. The through hole may be sized to receive the cylindrical raised portion of the square nut. The first arm may extend away from the body portion in a perpendicular direction. The first arm may comprise a first proximal portion, a first linking portion and a first distal portion. The first linking portion may be disposed between the first proximal portion and the first distal portion. The first linking portion may comprise a first tooth. The first tooth may define a first pivot point. The first distal portion may include a first retaining hook defining a portion of a channel. The second arm may extend away from the body portion in the perpendicular direction. The second arm may comprise a second proximal portion, a second linking portion and a second distal portion. The second linking portion may be disposed between the second proximal portion and the second distal portion. The second distal portion may include a second retaining hook. The first arm may be parallel to the second arm. A rail may be configured to pivotally engage the elastically deflectable tab, the first retaining hook, and the second retaining hook of the retention bracket such that the retention bracket receives and retains the rail.

In various embodiments, a roof attachment system may comprise a mounting bracket, and a retention bracket. The mounting bracket may be configured to be attached to a roof. The retention bracket may be adjustably coupled to the mounting bracket. The retention bracket may comprise a body portion, a first arm and a second arm. The first arm may be operatively coupled to the body portion. The first arm may also extend away from the body portion. The first arm may be substantially perpendicular to the body portion. The second arm may be operatively coupled to the body portion. The second arm may also extend away from the body portion. The second arm, like the first arm, may be substantially perpendicular to the body. The first arm may be parallel to the second arm. The first arm and the second arm may also have complementary profiles. The first arm and the second arm may be laterally separated on the body.

In various embodiment, the mounting bracket may be a tile hook. In various embodiments, the mounting bracket may be an extending portion of a tile hook. The extending portion may be mountable to an adjustable base or may be a integrally connected to a base portion.

In various embodiments, the mounting bracket may have an L-shaped profile.

In various embodiments, the mounting bracket may be configured to mount with a flashing.

In various embodiments, the first arm of the retention bracket may comprise a retaining hook.

In various embodiments, the roof attachment system may further comprise a rail configured to engage a deflectable tab of the retention bracket.

In various embodiments, the mounting bracket may comprise a plurality of serrations configured to engage the retention bracket. The mounting bracket may also comprise an elongated slot. In this regard, the mounting bracket may be configured to adjustably retain the retention bracket.

In various embodiments, the first arm may comprise a proximal portion, a distal portion, and a linking portion disposed between the proximal portion and the distal portion. The linking portion comprises a tooth. The tooth can create a pivot point and an interference fit between a rail and the retention bracket. The retention bracket may comprise an elongated slot or slotted opening.

In various embodiments, a roof mount may comprise a flashing, a mounting bracket, a retention bracket, fastener, and a rail. The mounting bracket may comprise a slot. The retention bracket may be adjustably coupled to the mounting bracket. The retention bracket may comprise a body portion, a first arm and a second arm. The body portion may comprise an elastically deflectable tab. The first arm may extend away from the body portion in a perpendicular direction. The first arm may comprise a first retaining hook at a first distal end of the first arm. The second arm may also extend away from the body portion in the perpendicular direction. The second arm, like the first arm, may comprise a second retaining hook at a second distal end of the second arm. The first arm may be parallel to the second arm. The fastener may be configured to adjustably couple the retention bracket to the mounting bracket. The rail may be configured to engage the elastically deflectable tab, the first retaining hook, and the second retaining hook of the retention bracket in response to the retention bracket receiving and retaining the rail.

In various embodiments, the mounting bracket may be one of an L-foot or a tile hook.

In various embodiments, the fastener may be configured to pass through the slot and the retention bracket to adjustably connect the retention bracket on the mounting bracket. The fastener may engage a square nut. The retention bracket may comprise a projection adjacent a mounting hole. The boss may be located to restrict rotation of the square nut. More particularly, the mounting bracket may comprise a pair of anti-rotation bosses that are configured to restrict rotation of the square nut. The square nut may comprise an annular protrusion disposed on a first surface of the square nut. The annular protrusion may be installable in the mounting hole of the retention bracket.

In various embodiments, the first arm may comprise a tooth. The tooth may define a pivot point on a top surface of the first arm.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein refers to the accompanying drawings, which show exemplary embodiments by way of illustration. While these exemplary embodiments are described in sufficient detail to enable those skilled in the art to practice the inventions, other embodiments may be realized, and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

The present disclosure relates to rail based solar panel racking. The roof attachment systems described herein are installable on any roof type with a suitable roof attachment. These roof attachment systems are adapted to provide efficient, cost effective installation methods.

Figure 1:
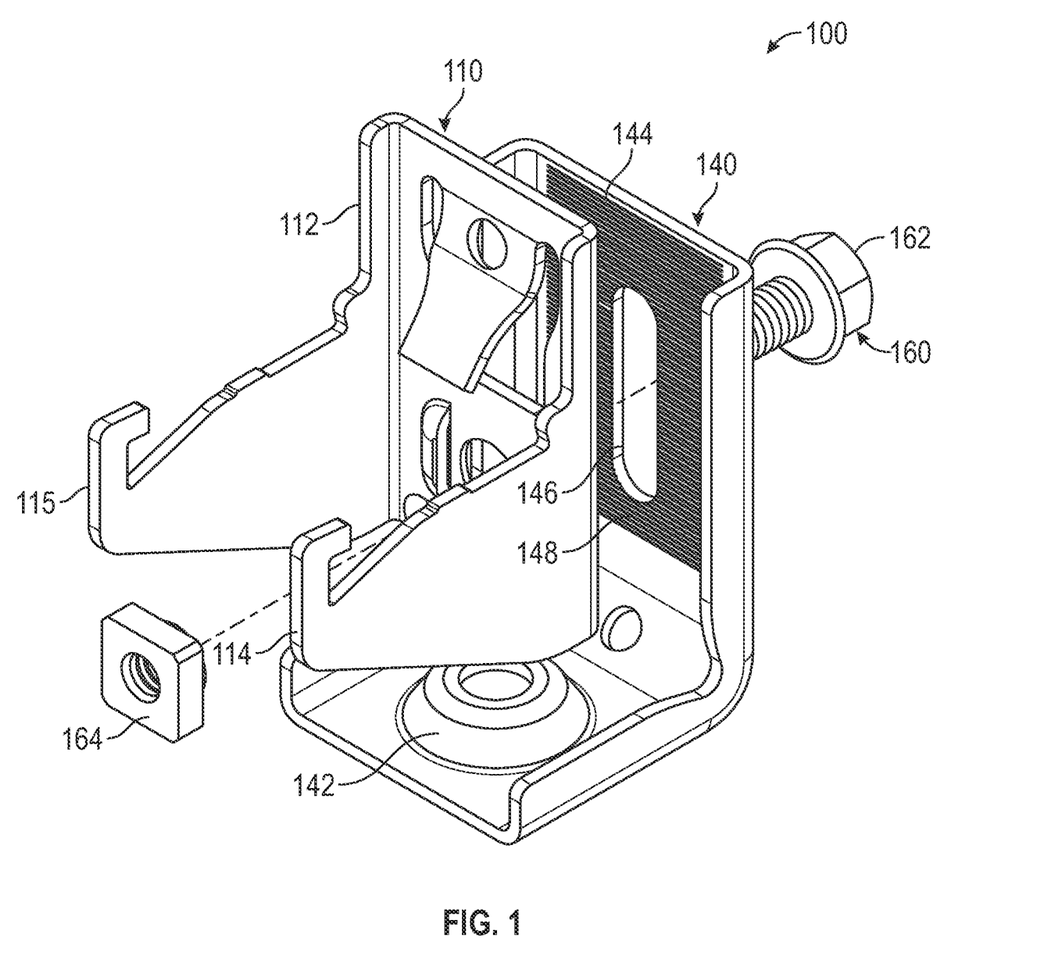
FIG. 1 illustrates a front exploded prospective view of a roof attachment system, in accordance with various embodiments.

In various embodiments and with reference to FIG. 1, a roof attachment system 100 may comprise a retention bracket 110 (i.e. a clicker), a mounting bracket 140, and a fastener assembly 160. Retention bracket 110 may comprise a body 112, a first arm 114, and a second arm 115. Mounting bracket 140 may be an L foot. Mounting bracket 140 may comprise a body portion 144 and may include a recess 142. Body portion 144 may define an elongate slot 146 (e.g., an oval opening, or an aperture with a length greater than a width). Body portion 144 may also define a plurality of serrations 148 or surface texture adjacent the elongate slot 146 or an aperture.

In various embodiments, fastener assembly 160 may include a fastener 162 and a nut 164. While the drawings show a square nut, any suitable nut having any suitable shape can be used. Moreover, the anti-rotation features discussed herein will work with any suitable nut that includes a flat surface. Moreover, the annular or cylindrical projection may be added to any suitably shaped nut.

In various embodiments, first arm 114 and second arm 115 of retention bracket 110 may be operatively coupled to or integrally formed with body 112. First arm 114 and second arm 115 may be substantially perpendicular to body 112. First arm 114 and second arm 115 may also be substantially parallel to one another. First arm 114 and second arm 115 may have complementary profiles. First arm 114 and second arm 115 may extend laterally from opposing sides of body 112. Moreover, retention bracket 110 may be configured to receive and retain a rail.

With reference to FIGS. 2A-2E, retention bracket 210 may comprise a body 212, a first arm 214, and a second arm 215. First arm 214 may comprise a first proximal portion 216 and a first distal portion 218. Second arm 215 may also comprise a second proximal portion 217 and a second distal portion 219. First arm 214 may include a first rail stop 211 in the first proximal portion 216. Second arm 215 may include a second rail stop 209 in the second proximal portion 217. First arm 214 may comprise a first retaining hook 222 disposed at the first distal portion 218 of first arm 214. First retaining hook 222 may define a first hook channel 233. Similarly, second arm 215 may comprise a second retaining hook 223 disposed at the second distal portion 219 of second arm 215. Second retaining hook 223 may define a second hook channel 235. First arm 214 may also comprise a first linking portion 220 disposed between first proximal portion 216 and first distal portion 218. Similarly, second arm 215 may also comprise a second linking portion 221 disposed between second proximal portion 217 and second distal portion 219.

Body 212 of retention bracket 210 may comprise an elastically deflectable tab 224. Elastically deflectable tab 224 may be disposed a distance above the first proximal portion 216 of first arm 214 and/or second proximal portion 217 of second arm 215. Elastically deflectable tab 224 may also extend a distance beyond first rail stop 211 and second rail stop 209. Elastically deflectable tab 224, first arm 214, second arm 215, first retaining hook 222, and second retaining hook 223 may define a locking channel 229. Locking channel 229 may comprise the space between first hook channel 233 and first rail stop 211. Locking channel 229 may also comprise the space between second hook channel 235 and second rail stop 209. Locking channel 229 may be sized to receive a rail for mounting solar panels.

First linking portion 220 may comprise a raised portion of first tooth 236. The raised portion of first tooth 236 may be defined in a top surface of first arm 214. First tooth 236 may be formed or coined in first arm 214. First tooth 236 may define a pivot point. First tooth 236 and/or the pivot point defined by first tooth 236 may protrude into channel 229. Second linking portion 221 may comprise a second tooth 237. Second tooth 237 may be defined in a top surface of second arm 215. Second tooth 237 may be formed or coined in second arm 215. Second tooth 237 may define a pivot point. Second tooth 237 and/or the pivot point defined by second tooth 237 may protrude into channel 229. First tooth 236 and second tooth 237 may facilitate installation of a rail. In this regard, first tooth 236 and second tooth 237 may facilitate pivotal engagement with the structures defining channel 229 (e.g., elastically deflectable tab 224, first arm 214, second arm 215, first retaining hook 222, and second retaining hook 223). Moreover, the pivotal engagement may allow the rail to "click," "snap" or "pop" into channel 229, such that the rail contacts elastically deflectable tab 224, first arm 214, second arm 215, first retaining hook 222, second retaining the 223, first tooth 236, and second tooth 237. The rail may also contact and/or engage first rail stop 211 and second rail stop 209 such that the rail is locked into place in locking channel 229 by elastically deflectable tab 224. Moreover, there may be an interference fit between the retention bracket 210 and the rail.

In various embodiments, body 212 of retention bracket 210 may also comprise anti-rotation boss system 230. Anti-rotation boss system may comprise one or more bosses, pins or other suitable structures configured to prevent movement or rotation. For example, anti-rotation boss system 230 may comprise boss 231 and boss 232. Boss 231 and/or boss 232 may be formed in or operatively coupled to body 212. Body 212 of retention bracket 210 may also comprise a mounting or through hole 234 or slot. Boss 231 and/or boss 232 may be formed or coupled to body 212 at a location adjacent through hole 234 or slot (e.g., an oval opening, or an aperture with a length greater than a width).

Figure 2A:
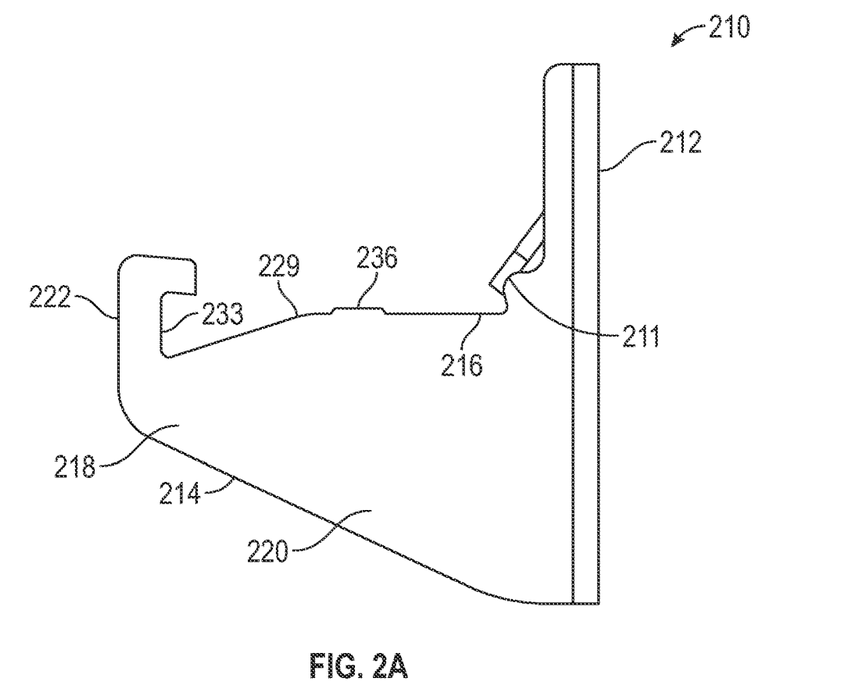
FIG. 2A illustrates a side view of a retention bracket of a roof attachment system, in accordance with various embodiments.
Figure 2B:
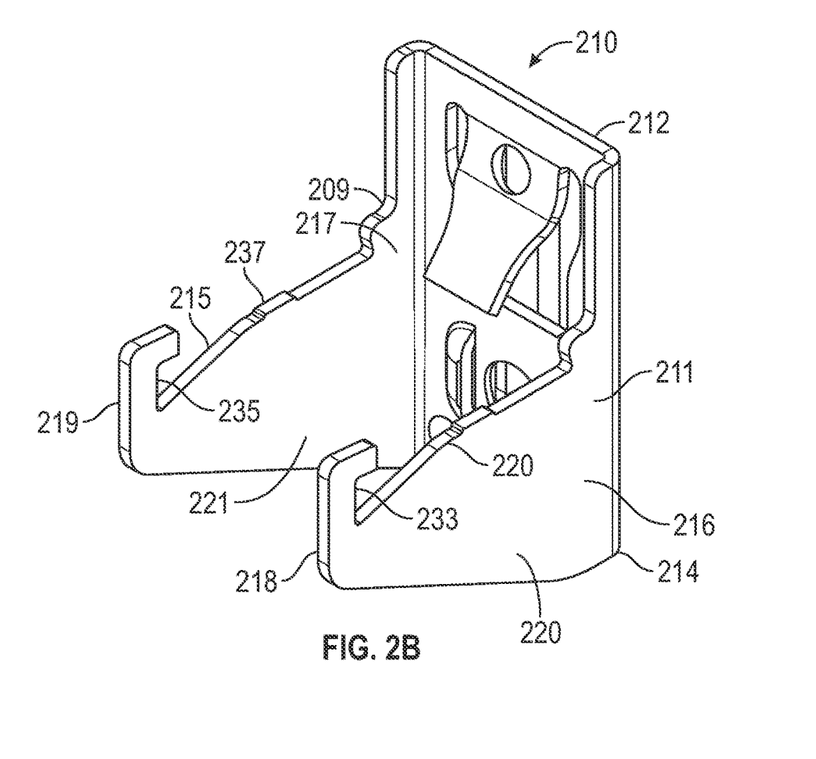
FIG. 2B illustrates a front perspective view of a retention bracket of a roof attachment system, in accordance with various embodiments.
Figure 2C:
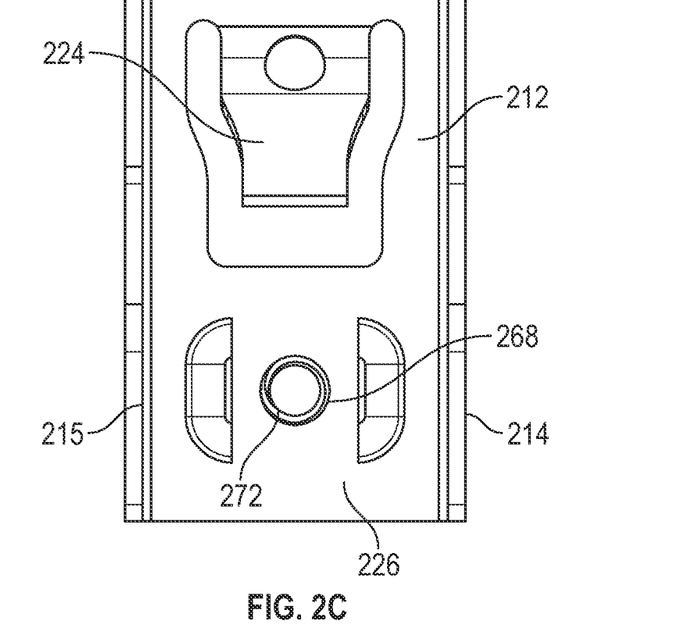
FIG. 2C illustrates a front view of a retention bracket of a roof attachment system, in accordance with various embodiments.
Figure 2D:
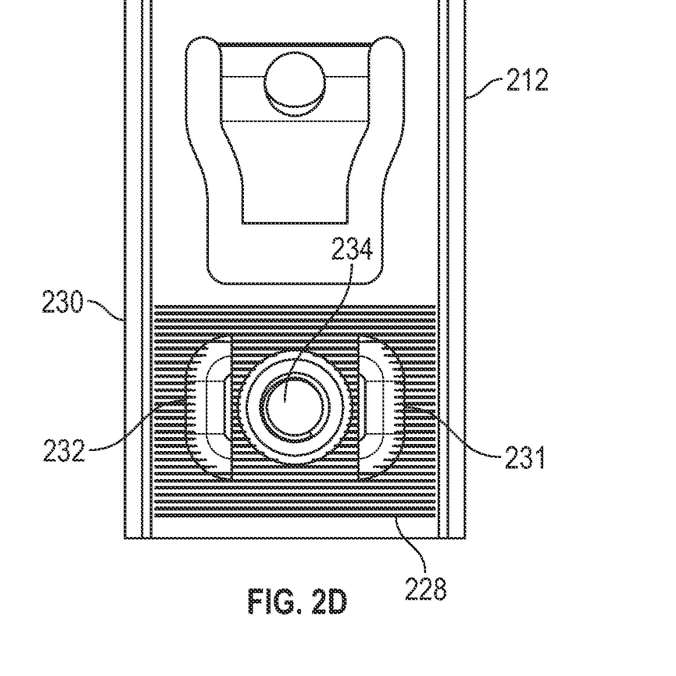
FIG. 2D illustrates a back view of a retention bracket of a roof attachment system, in accordance with various embodiments.
Figure 2E:
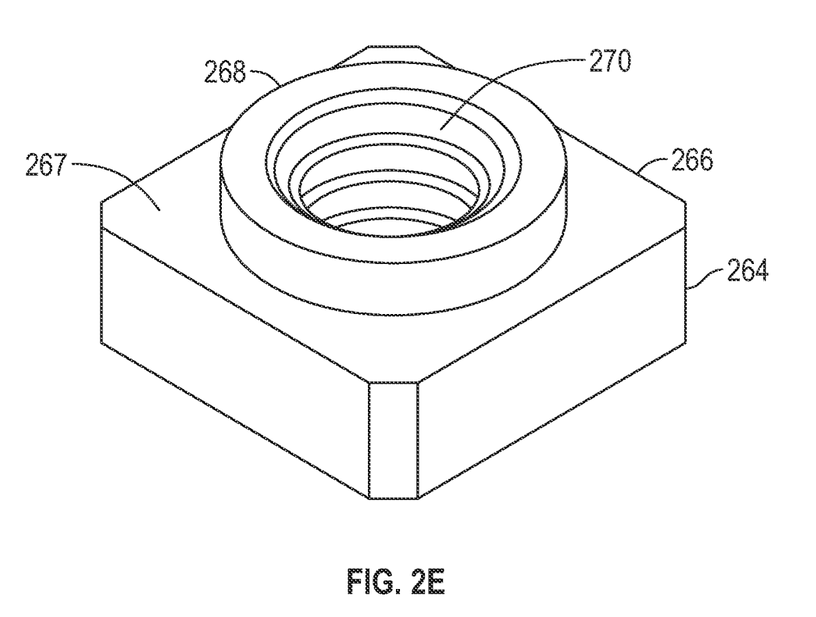
FIG. 2E illustrates a perspective view of a square nut of a roof attachment system, in accordance with various embodiments.
Figure 3A:
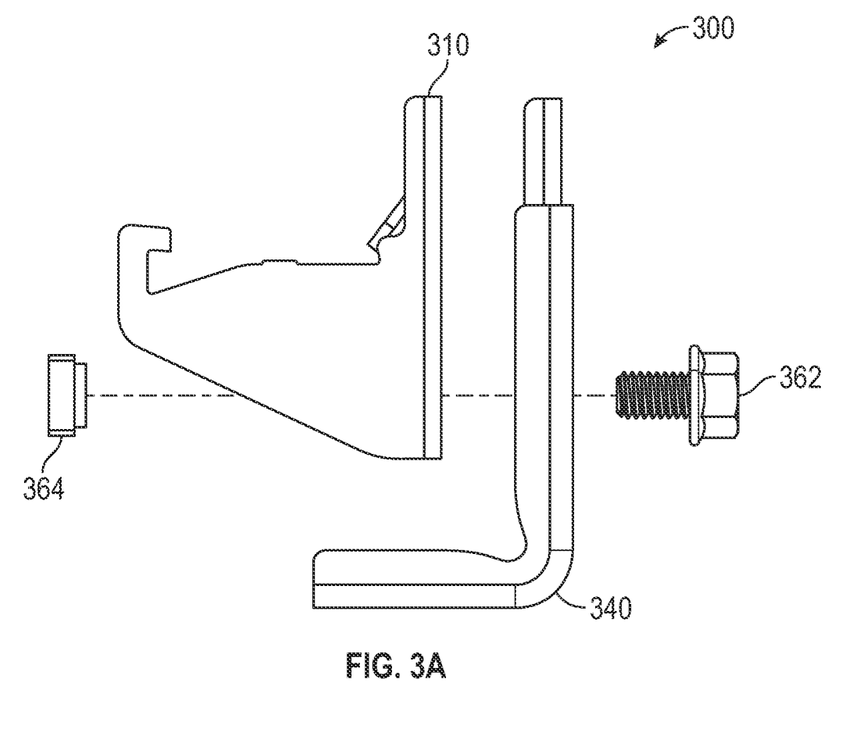
FIG. 3A illustrates a side exploded view of a roof attachment system, in accordance with various embodiments.
Figure 3B:
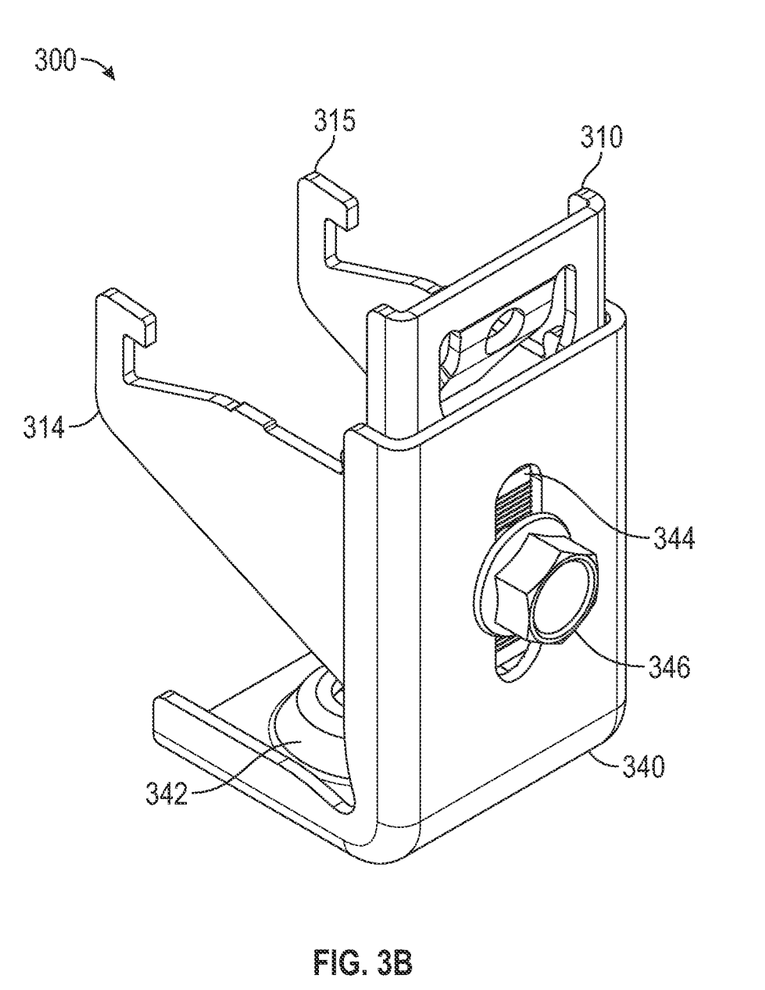
FIG. 3B illustrates a back perspective view of a roof attachment system, in accordance with various embodiments.
Figure 3C:
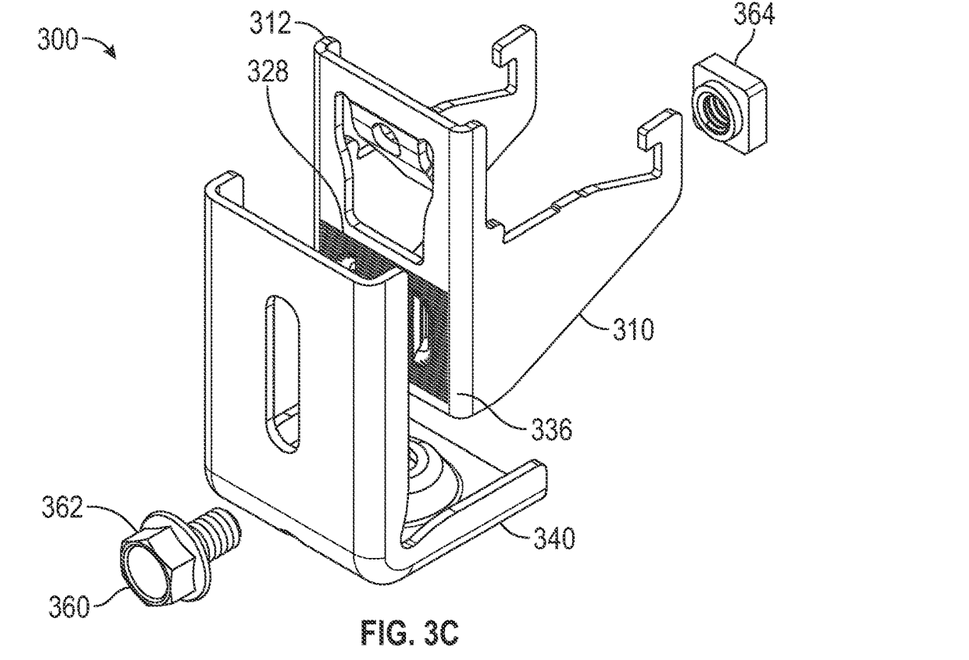
FIG. 3C illustrates a back perspective view of a roof attachment system, in accordance with various embodiments.
Figure 3D:
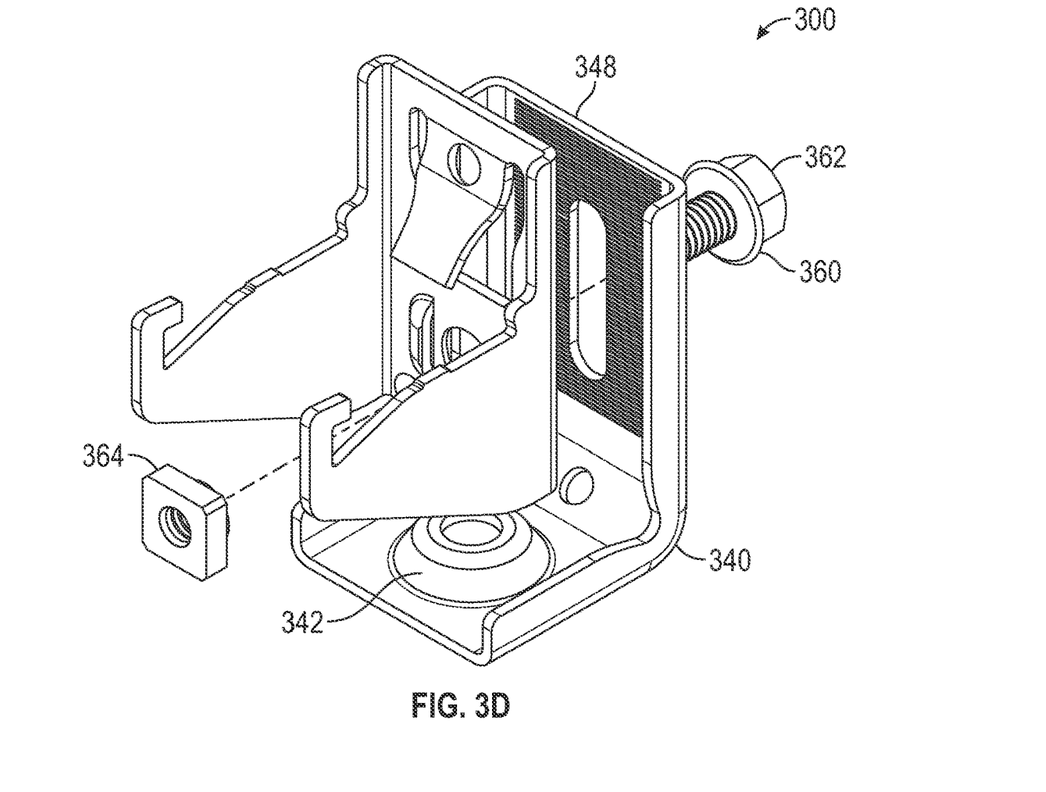
FIG. 3D illustrates a front exploded perspective view of a roof attachment system, in accordance with various embodiments.
Figure 3E:
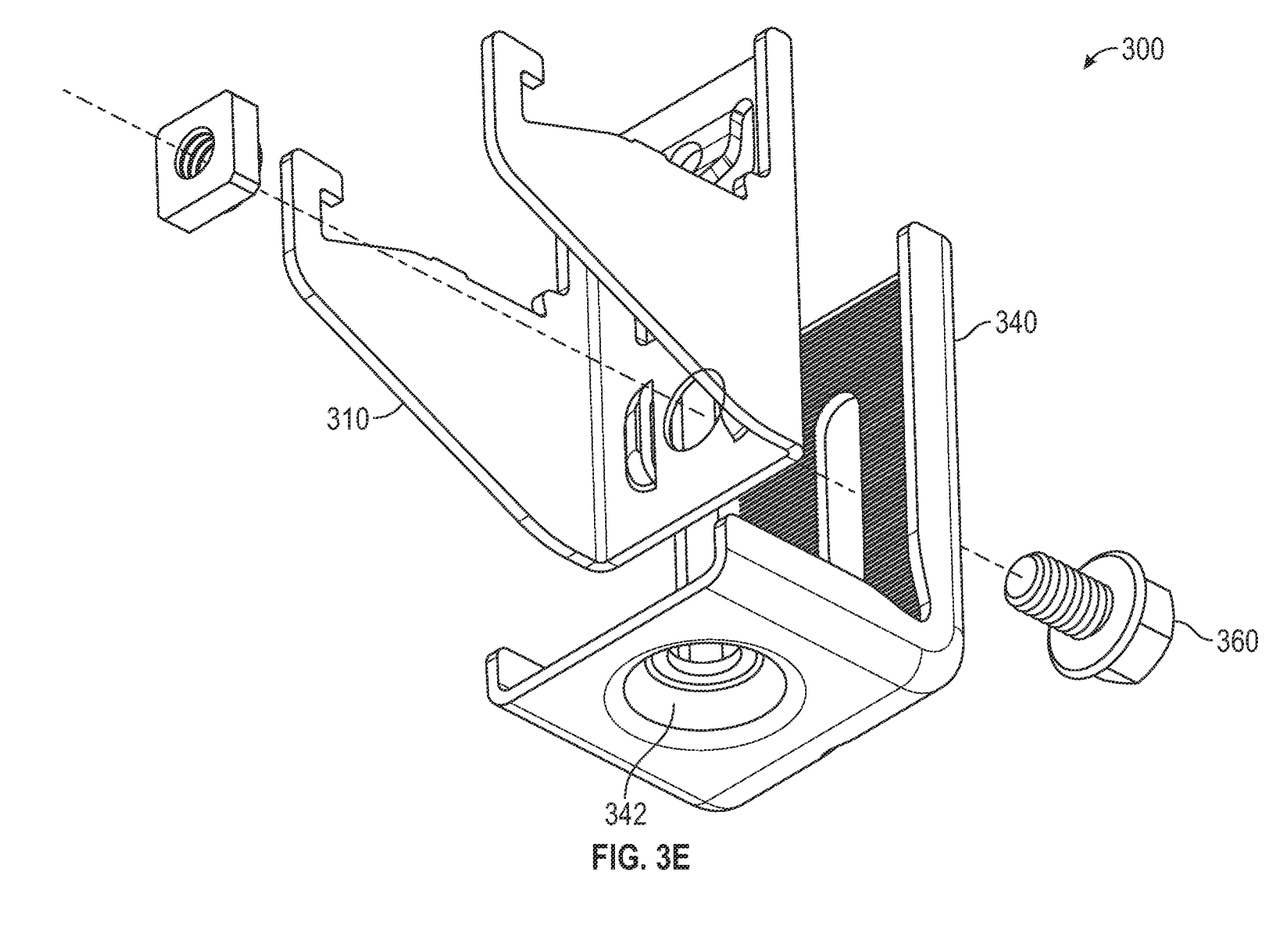
FIG. 3E illustrates a bottom exploded perspective view of a roof attachment system, in accordance with various embodiments.

In various embodiments, retention bracket 210 may be coupled to a mounting bracket with a fastener assembly comprising a nut 264. Nut 264 may be any suitable nut as described herein (e.g., a square nut, a hexagonal nut, a custom nut, and off the shelf nut, and/or the like). Square nut 264 may comprise a body 266 having a top surface 267. Square nut 264 may also comprise a cylindrical or annular portion 268. Annular portion 268 may protrude or extend from first surface 267 or may be operatively coupled to body 266 on first surface 267. Annular portion 268 may be sized such that it is installable in through hole 234. Moreover, body 266 of square nut 264 may be sized such that it is installable between boss 231 and/or boss 232. Square nut 264 may be installed on body 212. Annular portion 268 of square nut 264 may pass through body 212 and protrude into a chamfered portion 226 (e.g., a recess or depression) of body 212. A portion of the distal end of annular portion 268 may be deformed (e.g., lanced, flared, or staked) to deform a portion of annular portion 268 into chamfered portion 226 of body 212. By deforming a portion of annular portion 268 into chamfered portion 226 of body 212 square nut 264 is mechanically attached to body 212. If the fastener is removed from square nut 264 retention bracket 210 may be removed from the mounting bracket, but square nut 264 will be retained in retention bracket 210.

In various embodiments and with reference to FIGS. 3A-3E, roof attachment system 300 may comprise a retention bracket 310 and a mounting bracket 340. Mounting bracket 340 may comprise a body 344 having a base portion 350 and a vertical portion 352. Base portion 350 and vertical portion 352 may be operatively coupled to one another or integrally formed with one another. Vertical portion 352 may be substantially perpendicular to the base portion 350. In this regard, the 344 may have an L-shaped profile.

In various embodiments, roof attachment system 300 may comprise a retention bracket 310 that is adjustably coupled to a mounting bracket 340. In this regard, retention bracket 310 may be adjustably coupled to mounting bracket 340 via elongate slot 346 (e.g., an oval opening, or an aperture with a length greater than a width) with fastener assembly 360. Fastener 362 may be installable through the one elongate slot 346 and may threadedly engage square nut 364 in the retention bracket 310.

Body 312 of retention bracket 310 may include a plurality of serrations 336 defined on a back surface of body 312, in accordance with various embodiments. The plurality of serrations may be defined adjacent to and through the chamfered portion 328 of body 312. Body 344 of mounting bracket 340 may also comprise a plurality of serrations 348.

More particularly, a front surface of vertical portion 352 may similarly comprise a plurality of serrations 348. The plurality of serrations 348 on vertical portion 352 may be disposed about elongate slot 346. The plurality of serrations 348 may be configured to engage or interface with the plurality of serrations 336 to couple or bind retention bracket 310 and mounting bracket 340.

Figure 4A:
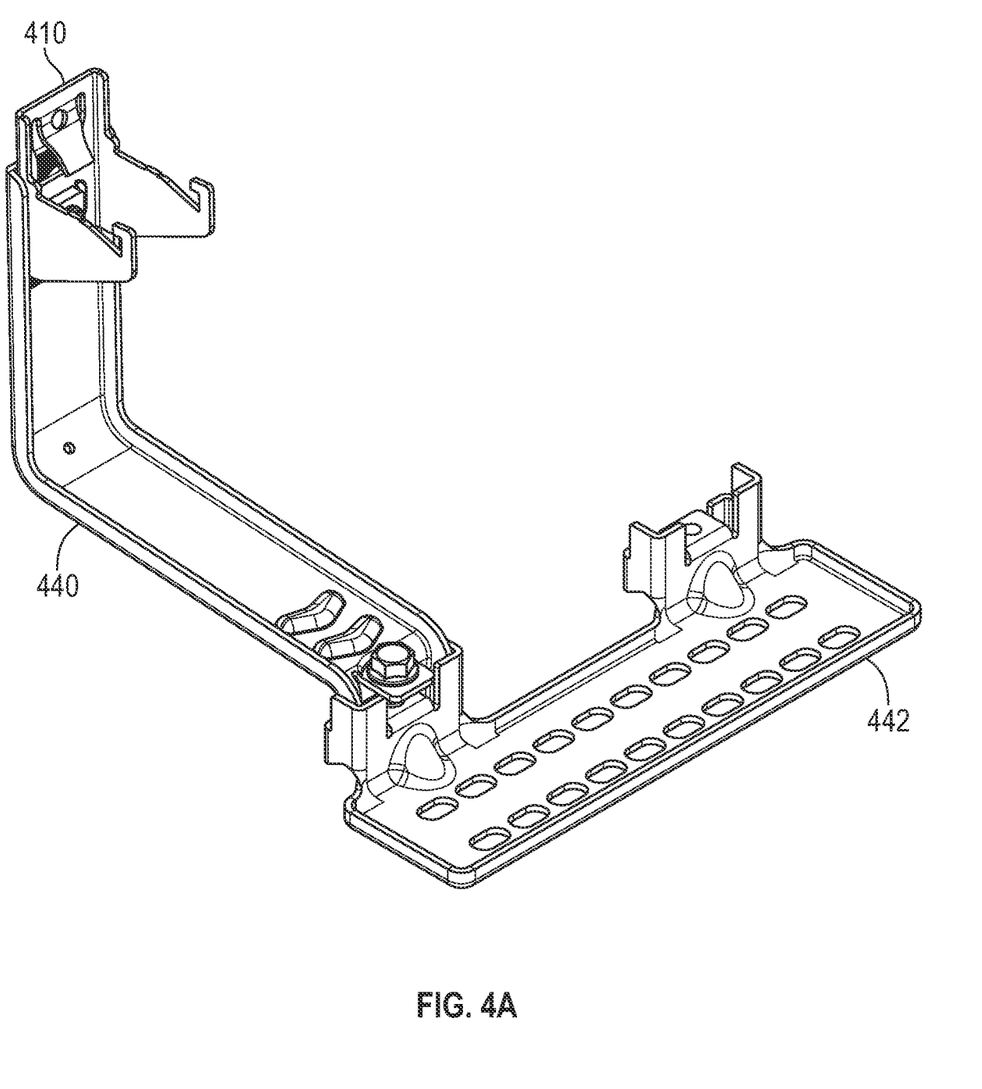
FIG. 4A illustrates a front perspective view of a tile roof attachment system, in accordance with various embodiments.
Figure 4B:
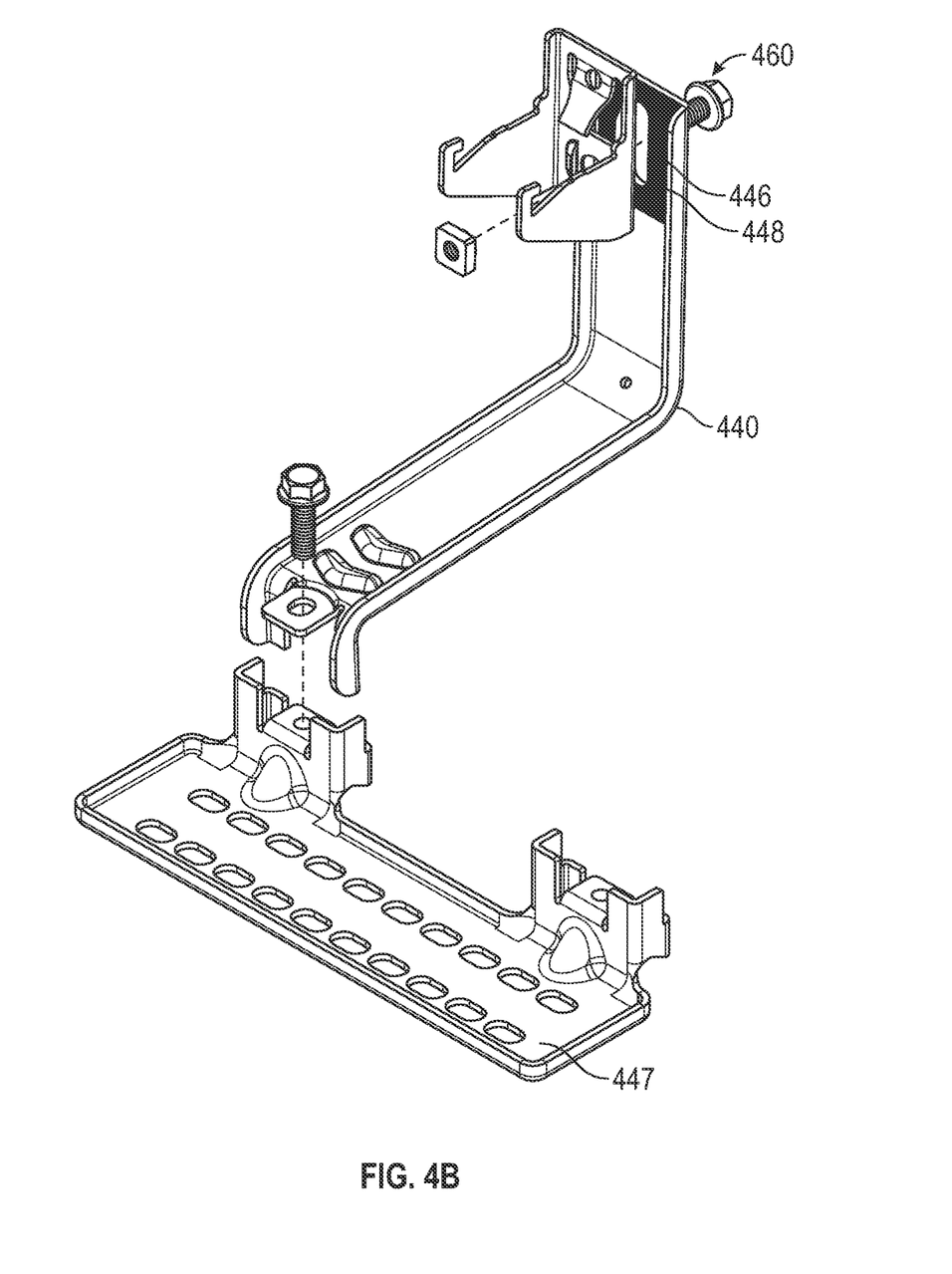
FIG. 4B illustrates a front exploded perspective view of a tile roof attachment system, in accordance with various embodiments.

In various embodiments and with reference to FIGS. 4A and 4B, the retention bracket 410 may be operatively couple to a mounting bracket 440 (e.g., a tile hook or tile replacement system). Tile hook 440 may include a mounting plate 442. Mounting plate 442 may define a plurality of holes 447. The plurality of holes 447 may facilitate installation of tile hook 440 on the roof of any suitable construction or rafter spacing. Like the other embodiments described herein, the tile hook 440 may include an elongate slot 446. Elongate slot 446 may allow for retention bracket 410 to be adjustably coupled to tile hook 440 with fastener assembly 460. Tile hook 440 may also comprise a plurality of serrations 448 that are configured to engage a plurality of serrations disposed on a back surface of retention bracket 410, as discussed herein.

In various embodiments and with reference to FIGS. 3A-3E and 5A and 5B, a flashing 580 extends substantially along a plane but includes an upwardly extending protrusion, such as the illustrated projection 586 that tapers upward, out of the plane. The upwardly extending projection 586 has a first diameter d1 in the plane, and a second diameter d2 in a second plane that is substantially parallel to but spaced from the plane. The second diameter d2 is less than the first diameter d1, to form a truncated cone or frustoconical shape. Projection 586 may also be sized to receive a seal 588. Seal 588 may also have a frustoconical or other suitable profile. In other embodiments, projection 586 and seal 588 can have other shapes and configurations, corresponding to the shape of a recess 342 an underside of an associated mounting bracket 340. Additional information about flashing, projection shapes, seals and water tight roof attached are disclosed in commonly-assigned U.S. Pat. No. 8,209,914, filed on Oct. 28, 2010, and U.S. Pat. No. 9,134,044, filed on Apr. 21, 2014, the contents of both of which are herein incorporated by reference in their entirety for any purpose.

Figure 5A:
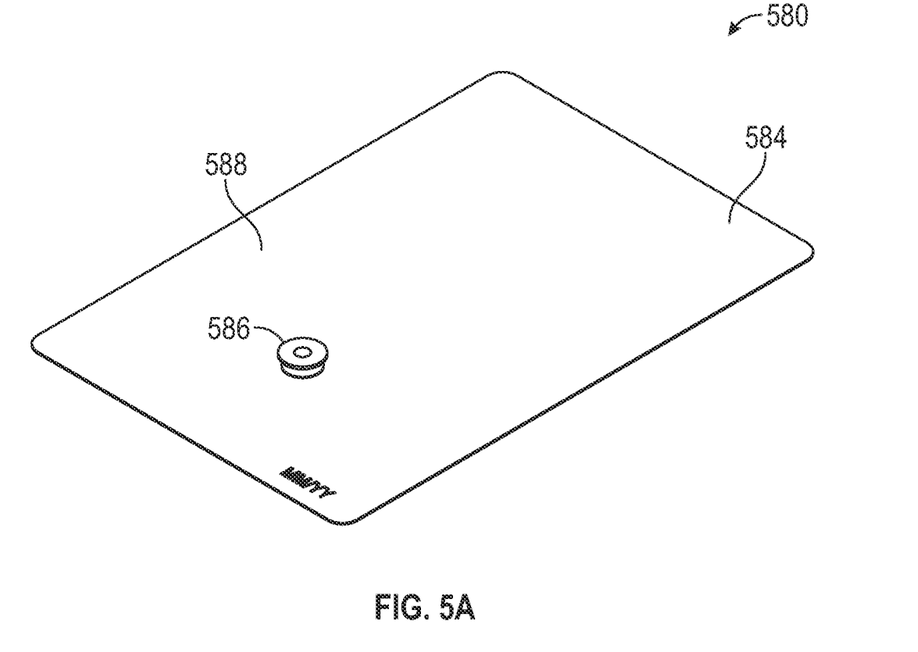
FIG. 5A illustrates a top perspective view of a first flashing for a roof attachment system, in accordance with various embodiments.
Figure 5B:
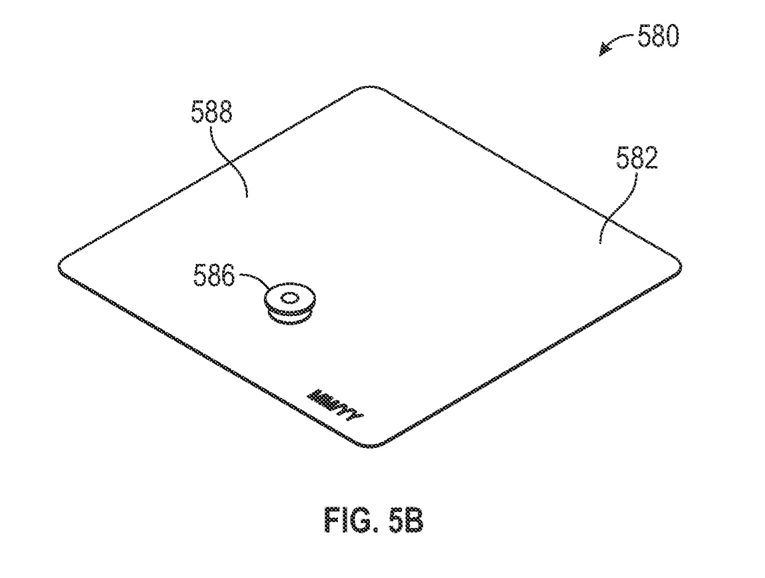
FIG. 5B illustrates a top perspective view of a second flashing for a roof attachment system, in accordance with various embodiments.

Flashing 580 may be provided in any suitable length and/or size. Traditionally flashings have been provided in 12-inch lengths. This allows the flashing to extend up underneath a first and second course of shingles creating the area where the flashing is beneath both of these courses called the headlap. This requires a flashing installer to disrupt two courses of composition roofing shingles above a desired installation point and remove nails to allow the flashing to be installed. This installation process has been traditionally accepted and required by roofing manufacturers to maintain the integrity of the roofing watershedding capacity. This requirement is of value when the flashing and mounting brackets are located where two shingles come together called the shingle joint as well as on three tab shingles where there is a keyway between the tabs. With the advent of architectural shingles dominance in the roofing market the intersection of mounts and keyways or shingle joints are dramatically reduced consequently reducing the instances where creating the headlap is of value. In this case, a shorter flashing that only extends up under a single course of shingles is an improvement because the value of not disturbing the roofing material and removing nails outweighs the benefit of creating the headlap. For this purpose, flashing 582 may be provided in a shorter length to provide for a watertight installation. In this regard, the flashing may be installable underneath a single adjacent course of shingles without having to remove nails.

Figure 6A:
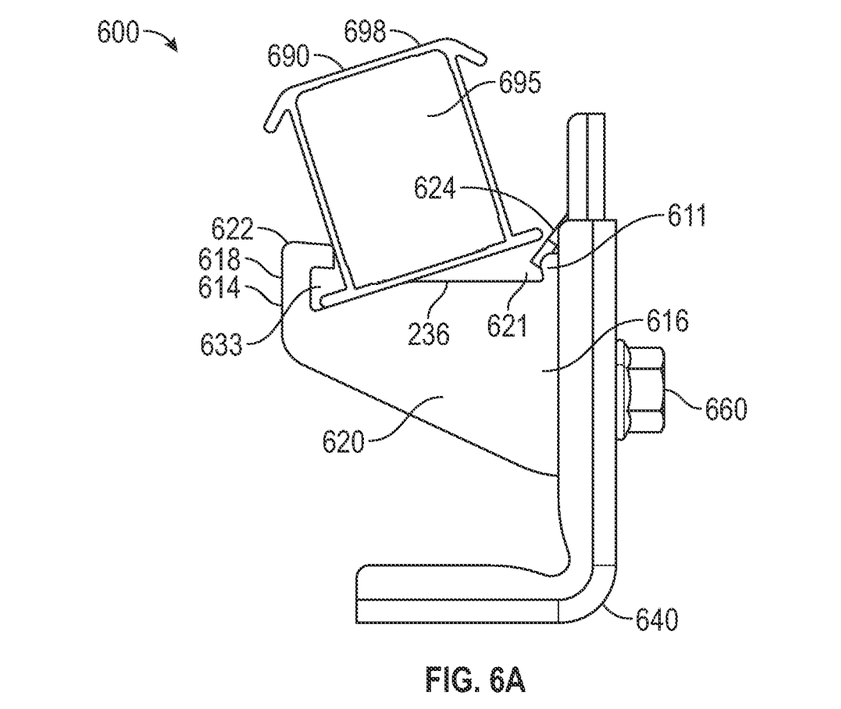
FIG. 6A illustrates a side view of a rail in a pivoted position in a roof attachment system, in accordance with various embodiments.
Figure 6B:
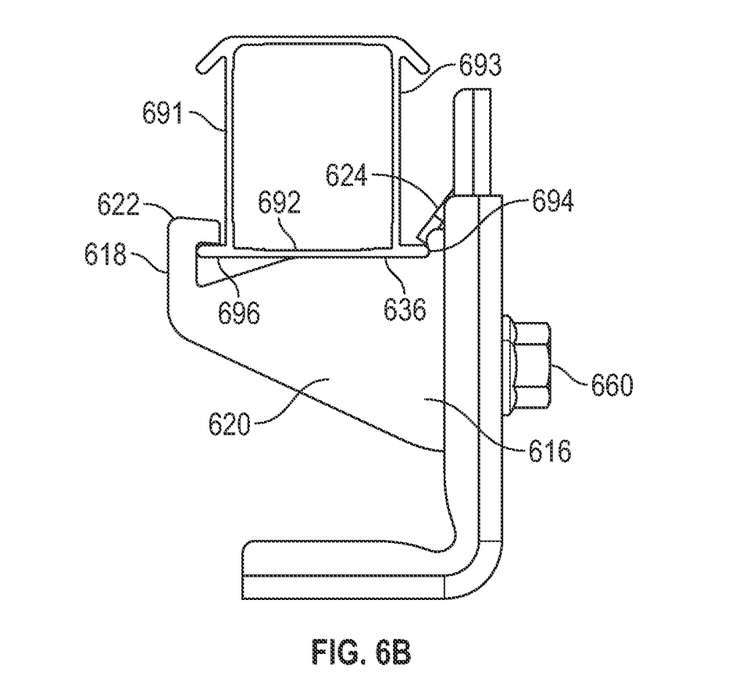
FIG. 6B illustrates a side view of a rail in an installed position in a roof attachment system, in accordance with various embodiments.

In various embodiments and with reference to FIGS. 6A and 6B, roof attachment system 600 may comprise a rail 690. Rail 690 may have a bottom surface 692 and a top surface 698. Bottom surface 692 and top surface 698 may be substantially parallel to one another. In other embodiments rail 690 may not include a top surface 698 presenting an open channel rail or top surface 698 may not be parallel to bottom surface 692 and may be curved. Rail 690 may also comprise a first side wall 691 and a second side wall 693. First side wall 691 and second side wall 693 may be substantially parallel to one another. In other embodiments side walls 691 and 693 may not be parallel and may not be straight. First side wall 691 and second side wall 693 may be substantially perpendicular to the top surface 698 and bottom surface 692. First side wall 691, second side wall 693, bottom surface 692, and top surface 698 may be operatively coupled together to form a profile of rail 690. In this regard, Rail 690 may generally have a square, rectangular, and/or box profile. Bottom surface 692 may also include first engagement tab 694 and second engagement tab 696 that protrude be on the first side wall 691 and second side wall 693.

In various embodiments, roof attachment system 600 may be configured to receive, support, and retain a rail 690. In this regard, the roof attachment system 600 may define a channel or slot 621 (e.g., a "pop" in slot or a "click" in slot). Channel 621 (e.g., the place defined by the bottom thickness of rail 690) may be defined in the profile of retention bracket 610 by the top surface of first arm 614, retaining hook 622, and elastically deflectable tab 624. Retaining hook 622 may define first hook channel 633. Moreover, during installation and as shown in FIG. 6A, rail 690 may be partially and or pivotally installed in a portion of channel 621 such as, for example, first hook channel 633. Rail 690 may also engage tooth 636 defined in linking portion 620 of first arm 614 to rock or pivot into engagement with retaining hook 622, the first rail stop 611 and elastically deformable tab 624. More specifically, second engagement tab 696 may be pivot it into engagement with retaining hook 622 as shown in FIG. 6B. Rail 690 may also rock or pivot on tooth 636 and engage and deflect elastically deflectable tab 624. More specifically, first engagement tab 694 may contact and deflect elastically deflectable tab 624 such that rail 690 and first engagement tab 694 rotate past elastically deflectable tab 624. In this regard, first engagement tab 694 is disposed beneath elastically deflectable tab 624, "locking" or "clicking" rail 690 into retention bracket 610.

Figure 7:
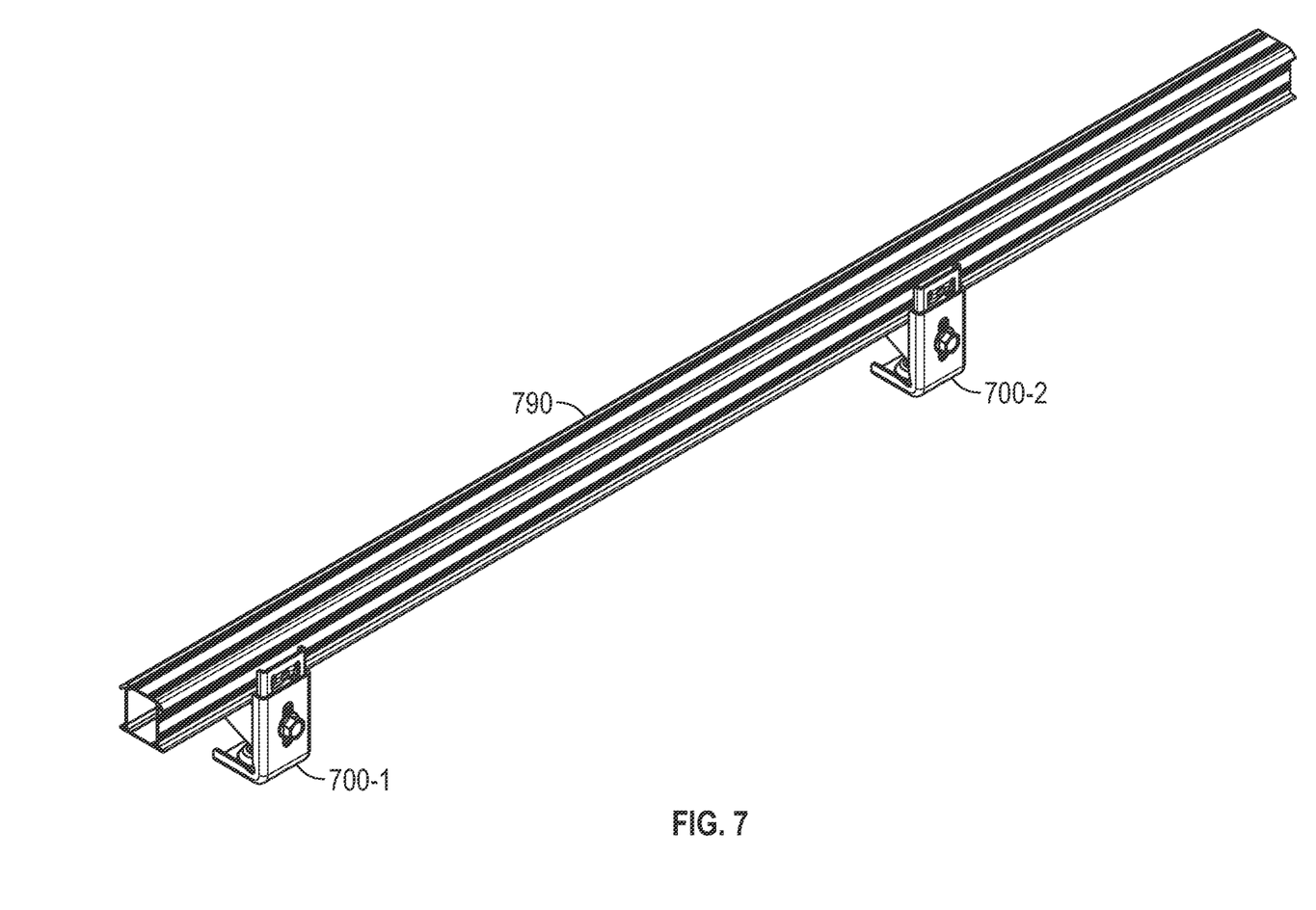
FIG. 7 illustrates a top perspective view of a rail in an installed position in a roof attachment system, in accordance with various embodiments.

In various embodiments and with reference to FIG. 7, roof attachment system 700 (e.g., roof attachment system 700-1, roof attachment system 700-2, roof attachment system 700-n) may be deployed in several installation locations along a piece of rail 790. The spacing between the various roof attachment system 700-1, roof attachment system 700-2, roof attachment system 700-n may be determined based on the construction of the roof, local code, engineering analysis and/or or any other suitable method. Moreover, when rail 690 is installed in roof attachment system 700-1, roof attachment system 700-2, roof attachment system 700-n, rail 690 may bind to prevent sliding of the rail. This binding may be caused by the interference fit between the retention bracket (e.g., retention bracket 210 and first tooth 236—as shown in FIG. 2A). This may aid in the installation of the rail on a roof.

The systems and structures (e.g., teeth 236 and 237, retaining hook 222 and 223, and/or similar structures) disclosed herein include an integrated electrical bonding system that is compliant with the building codes and safety standards, including, for example, UL 2703, or any other similar specification related to solar panel racking and/or mounting hardware Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A roof attachment system comprising:
   a mounting bracket configured to be attached to a roof; and
   a retention bracket adjustably coupled to the mounting bracket, the retention bracket comprising,
   a body portion,
   a first arm operatively coupled to the body portion and extending away from the body portion in a perpendicular direction;
   a second arm operatively coupled to the body portion and extending away from the body portion in the perpendicular direction,
   the first arm parallel to the second arm, and
   the first arm and the second arm having complementary profiles.

2. The roof attachment system of claim 1, wherein the mounting bracket is a tile hook.

3. The roof attachment system of claim 1, wherein the mounting bracket includes a recess shaped to receive a seal.

4. The roof attachment system of claim 1, wherein the mounting bracket has an L-shaped profile.

5. The roof attachment system of claim 1, wherein the mounting bracket is configured to mount with a flashing.

6. The roof attachment system of claim 1, wherein the first arm comprises retaining hook.

7. The roof attachment system of claim 1, further comprising a rail configured to engage a deflectable tab of the retention bracket.

8. The roof attachment system of claim 1, wherein the mounting bracket comprises a plurality of serrations configured to engage the retention bracket.

9. The roof attachment system of claim 1, wherein the mounting bracket comprises an elongated slot configured to adjustably retain the retention bracket.

10. The roof attachment system of claim 1, wherein the first arm comprises a proximal portion, a distal portion, and a linking portion disposed between the proximal portion and the distal portion.

11. The roof attachment system of claim 10, wherein the linking portion comprises a tooth that creates a pivot point and an interference fit between a rail and the retention bracket.

12. A roof mount comprising:
    a mounting bracket comprising a slot; and
    a retention bracket adjustably coupled to the mounting bracket, the retention bracket comprising,
    a body portion comprising an elastically deflectable tab,
    a first arm extending away from the body portion in a perpendicular direction, the first arm comprising a first retaining hook at a first distal end of the first arm,
    a second arm extending away from the body portion in the perpendicular direction, the second arm comprising a second retaining hook at a second distal end of the second arm,
    the first arm parallel to the second arm;
    a fastener configured to adjustably couple the retention bracket to the mounting bracket; and
    a rail configured to engage the elastically deflectable tab, the first retaining hook, and the second retaining hook of the retention bracket in response to the retention bracket receiving and retaining the rail.

13. The roof mount of claim 12, wherein the mounting bracket is one of an L-foot or a tile hook.

14. The roof mount of claim 12, wherein the fastener is configured to pass through the slot and the retention bracket to adjustably retain the retention bracket on the mounting bracket.

15. The roof mount of claim 14, wherein the fastener engages a square nut.

16. The roof mount of claim 15, wherein the retention bracket comprises a boss adjacent a mounting hole and located to restrict rotation of the square nut.

17. The roof mount of claim 15, wherein a pair of anti-rotation bosses are configured to restrict rotation of the square nut.

18. The roof mount of claim 16, wherein the square nut comprises an annular protrusion disposed on a top surface of the square nut, wherein the annular protrusion is installable in the mounting hole.

19. The roof mount of claim 12, wherein the first arm comprises a tooth defining a pivot point on a top surface of the first arm.

20. A roof mount comprising:
   a mounting bracket comprising a slot; and
   a fastener assembly comprising a fastener and a square nut, the square nut having a cylindrical raised portion;
   a retention bracket adjustably coupled to the mounting bracket with the fastener assembly, the retention bracket comprising,
      a body portion comprising an elastically deflectable tab, an anti-rotation boss, and a through hole adjacent the anti-rotation boss, the through hole sized to receive the cylindrical raised portion of the square nut,
      a first arm extending away from the body portion in a perpendicular direction, the first arm comprising a first proximal portion, a first linking portion and a first distal portion, the first linking portion disposed between the first proximal portion and the first distal portion and comprising a first tooth defining a first pivot point, the first distal portion including a first retaining hook,
      a second arm extending away from the body portion in the perpendicular direction, the second arm comprising a second proximal portion, a second linking portion and a second distal portion, the second linking portion disposed between the second proximal portion and the second distal portion, the second distal portion including a second retaining hook,
   the first arm parallel to the second arm; and
   wherein a rail is configured to pivotally engage the elastically deflectable tab, the first retaining hook, and the second retaining hook of the retention bracket such that the retention bracket receives and retains the rail.

* * * * *